United States Patent [19]
Jackson et al.

[11] Patent Number: 6,120,357
[45] Date of Patent: Sep. 19, 2000

[54] SYSTEM AND METHOD FOR $CO_2$ CLEANING OF DATA STORAGE DISKS

[75] Inventors: Robert S. Jackson, Little Canada; Arne B. Boberg, Shoreview, both of Minn.

[73] Assignee: Imation Corp., Oakdale, Minn.

[21] Appl. No.: 09/255,199

[22] Filed: Feb. 22, 1999

[51] Int. Cl.[7] ....................................... B24B 1/00
[52] U.S. Cl. ................... 451/53; 451/63; 451/413
[58] Field of Search .................. 451/38–40, 53, 451/78, 82, 63, 84, 413

[56] References Cited

U.S. PATENT DOCUMENTS

| | | |
|---|---|---|
| 4,038,786 | 8/1977 | Fong ..................................... 451/53 X |
| 5,001,873 | 3/1991 | Rufin ..................................... 451/53 X |
| 5,120,927 | 6/1992 | Williams et al. . |
| 5,279,775 | 1/1994 | Thomas et al. . |
| 5,283,773 | 2/1994 | Thomas et al. . |
| 5,322,987 | 6/1994 | Thomas et al. . |
| 5,362,941 | 11/1994 | Johnson et al. . |
| 5,364,474 | 11/1994 | Williford, Jr. . |
| 5,419,733 | 5/1995 | Johnson et al. . |
| 5,599,223 | 2/1997 | Mains, Jr. ................................. 451/39 |
| 5,882,244 | 3/1999 | Hiyama et al. ........................ 451/53 X |
| 5,944,581 | 8/1999 | Goenka ..................................... 451/39 |

OTHER PUBLICATIONS

Motemaster™ Article entitled "Experiment on Spin–Cleaning of Patterned Silicon Wafer Using $Co_2$ Snow," John F. Wilford, Emadel Enterprises, Inc., Sep. 1995, pp. 1–6 and FIGS. 1–6.

*Primary Examiner*—David A. Scherbel
*Assistant Examiner*—Anthony Ojini
*Attorney, Agent, or Firm*—Eric D. Levinson

[57] ABSTRACT

Systems and methods of thermal control in the carbon dioxide cleaning of data storage disks to reduce or prevent condensation on the surface of the media during cleaning with frozen carbon dioxide are disclosed. A hub recess receives at least a portion of the outer flange of the hub to improve contact between the data storage media and a media platform supporting the media. Contact between the media and the media platform may be further improved by drawing a vacuum through openings in the media platform. In addition, drawing a vacuum through a vacuum channel with an annular ring opening about the media platform and a tangential vacuum port may reduce fluttering of the media on the media platform.

22 Claims, 5 Drawing Sheets

SYSTEM AND METHOD FOR CO₂ CLEANING OF DATA STORAGE DISKS

FIELD OF THE INVENTION

The present invention relates to the field of carbon dioxide cleaning systems for data storage disks. More particularly, the present invention relates to carbon dioxide cleaning systems and methods for data storage disks that employ thermal control to enhance cleaning.

BACKGROUND OF THE INVENTION

The use of carbon dioxide spray systems for cleaning data storage disks is described in, for example, U.S. Pat. No. 5,419,733 (Johnson et al.). As discussed there, cleaning of data storage disks during manufacturing is particularly useful when tracks and other features are written into the surface of the disk using, e.g., laser energy. Such techniques can generate debris that can adversely affect the product if not removed before, during, and after processing. They may also affect the equipment in which the disks are to be used.

One potential problem with using conventional carbon dioxide cleaning systems is that the temperature of the disk surface will be lowered by the frozen carbon dioxide particles used for cleaning. If the disk surface temperature falls below the dew point of the air in which the disk is located, moisture can condense on the disk surface and, in some instances, frost can form on the disk surface. Both of those conditions, i.e., liquid or frozen water on the disk surface, severely impact the efficacy of the cleaning processes.

To reduce the likelihood of condensation on the disk surface, a variety of techniques have been employed. One solution is to increase the cycle time of the manufacturing equipment to allow the surface temperature of the disk to rise. That additional cycle time, however, impacts overall productivity and is not favored.

Another approach is to lower the dew point of the cleaning environment. This could be accomplished by drying the air in which the disk is located or purging the environment with a dry inert gas (e.g., nitrogen). This approach does, however, add additional cost to the cleaning process. Also, maintaining a closed or semisealed environment is not very conducive to high volume production in which many parts are continuously entering and exiting the cleaning system.

U.S. Pat. No. 5,419,733 (Johnson et al.) discloses a system involving a heated chuck on which the disk is located (where the term "chuck" as used by Johnson et al. includes both the spindle and the platform surrounding the spindle). The heat from the chuck is then transferred to those portions of the data storage medium in contact with the chuck through conduction. Likewise, the hub is also typically heated because at least a portion of the hub is in direct contact with the chuck during operation of the cleaning system.

One problem associated with the cleaning process and system discussed by Johnson et al. is that no provision is made for the thickness of the outer flange of the hub on the data storage disk. As a result, the portion of the data storage media near the hub is typically spaced from or lifted off of the chuck. That space limits the effectiveness of the heat transfer from the chuck to the portion of the media directly surrounding the hub. With the reduced heat transfer to counter the cooling effect of the carbon dioxide crystals, the surface temperature of the media is more likely to fall below the ambient dew point. Once the media surface temperature falls below the ambient dew point, condensation can form on the media surface and reduce the effectiveness of the carbon dioxide cleaning process.

Also, because the hub is heated and the data storage media directly surrounding the hub is rapidly cooled during the cleaning process, a temperature gradient can be induced across the boundary between the hub and the media surrounding the hub. That temperature gradient exists in spite of the heating of the media further away from the hub and in contact with the chuck because the rate of heat transfer through the data storage media itself is relatively low. As a result, the adhesives or other bonding agents used to attach the data storage media to the hub can become embrittled due to freezing and may, in some instances, crack. The cracks can reduce the strength of the bond between the data storage media and the hub.

As a result, a need exists for a simple and effective solution for preventing condensation on the surface of a data storage disk in a carbon dioxide cleaning system while preserving the integrity of the hub to media bond.

SUMMARY OF THE INVENTION

The present invention provides systems and methods of thermal control in the carbon dioxide cleaning of data storage disks to reduce or prevent condensation on the surface of the media during the cleaning process. The invention provides a hub recess receiving at least a portion of the outer flange of the hub to improve contact between the data storage media and a media platform supporting the media. Contact between the media and the media platform may be improved by drawing a vacuum through openings in the media platform. In addition, drawing a vacuum through a vacuum channel with an annular ring opening about the media platform and a tangential vacuum port may reduce fluttering of the media on the media platform.

In one aspect, the present invention provides a system for reducing condensation on the data storage media of a data storage disk during cleaning with carbon dioxide crystals, the data storage disk including data storage media attached to an outer flange of a central hub, the outer flange having a flange thickness, the system including a hub recess adapted to receive at least a portion of the outer flange of the central hub of the data storage disk; a media platform surrounding the hub recess, the media platform supporting the data storage media; at least one vacuum opening in the media platform; a cleaning nozzle directing carbon dioxide crystals at the data storage media of the data storage disk; and a heat source thermally connected to the media platform; whereby thermal energy is transferred to the hub and the data storage media during cleaning.

In another aspect, the present invention provides a system for reducing condensation on the data storage media of a data storage disk during cleaning with carbon dioxide crystals, the data storage disk including data storage media attached to an outer flange of a central hub, the outer flange having a flange thickness, the system including a hub recess adapted to receive at least a portion of the outer flange of the central hub of the data storage disk; a media platform surrounding the hub recess, the media platform supporting the data storage media; a vacuum channel surrounding the media platform, wherein the vacuum channel comprises a vacuum port oriented along a tangent to the media platform; a cleaning nozzle directing carbon dioxide crystals at the data storage media of the data storage disk; and a heat source thermally connected to the media platform; whereby thermal energy is transferred to the hub and the data storage media during cleaning.

In another aspect, the present invention provides a method for reducing water vapor condensation on the data storage media of a data storage disk during cleaning with carbon dioxide crystals by locating at least a portion of an outer flange of a hub of a data storage disk in a hub recess, wherein the data storage media is supported by a media platform surrounding the hub recess; drawing a vacuum through at least one vacuum opening in the media platform; directing a stream of carbon dioxide crystals at the data storage media from a cleaning nozzle; and heating the media platform.

In another aspect, the present invention provides a method for reducing water vapor condensation on the data storage media of a data storage disk during cleaning with carbon dioxide crystals by locating at least a portion of an outer flange of a hub of a data storage disk in a hub recess, wherein the data storage media is supported by a media platform surrounding the hub recess; drawing a vacuum through a vacuum channel located about the media platform, the vacuum being drawn through a vacuum port oriented along a tangent to the media platter; directing a stream of carbon dioxide crystals at the data storage media from a cleaning nozzle; and heating the media platform.

These and other features and advantages of the invention are described more completely below in connection with illustrative embodiments of the invention.

DETAILED DESCRIPTION OF ILLUSTRATIVE EMBODIMENTS OF THE INVENTION

The present invention provides thermal control systems and methods for the cleaning of magnetic data storage disks using carbon dioxide crystals to remove debris from the media of the disk that is formed during the laser servowriting process.

Figure 1:
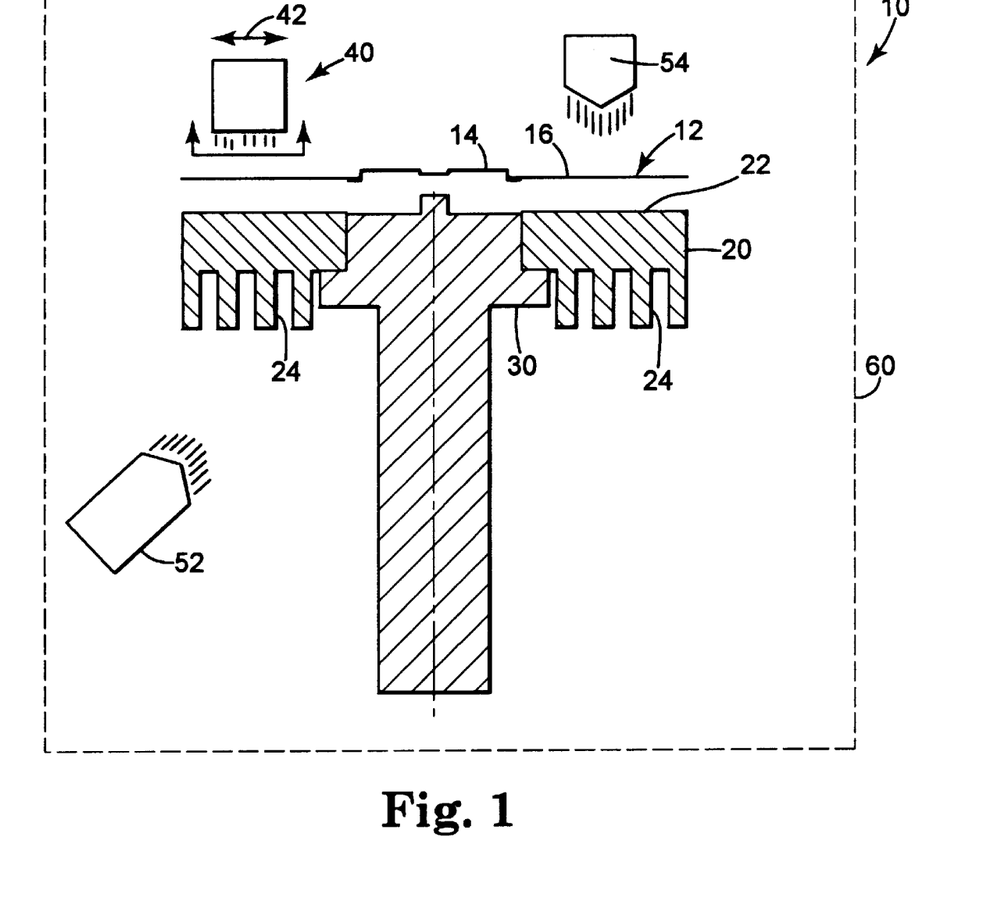
FIG. 1 is a schematic diagram of one system according to the present invention.

FIG. 1 is a schematic diagram of one system 10 according to the present invention. The system 10 is depicted as operating on a data storage disk 12 including a central hub 14 and media 16. The disk 12 is depicted above an assembly including a media platter 20 surrounding a spindle 30 in the partially exploded view of FIG. 1. Although not shown, it will be understood that the spindle 30 will typically be connected to a spindle and motor for rotating the spindle 30 about the vertical axis depicted in FIG. 1. The platter 20 and spindle 30 are operatively connected such that rotation of the spindle 30 also causes the platter 20 to rotate.

The platter 20 includes an upper surface 22 on which the media 16 of the disk lies during operation of the system 10. The platter 20 also includes heat transfer fins 24 extending from the bottom of the platter 20. The fins 24 are provided to enhance the transfer of thermal energy from the environment to the platter 20 by increasing the surface area of the platter 20.

Also depicted as a part of the system 10 is the carbon dioxide cleaning nozzle 40 used to direct crystals of carbon dioxide at the media 16 of the disk 12 as it is rotated on platter 20. The design of such cleaning nozzles 40 and systems for supplying the carbon dioxide crystals is well known and will not be described here. The nozzle 40 is translated across the radius of the disk 12 as indicated by arrow 42 as the disk 12 is rotated on the platter 20 and spindle 30 to effect cleaning of the surface of the media 16.

To enhance thermal control in one preferred system 10, a platter heat source 52 is provided to direct thermal energy at the fins 24 on the bottom of the platter 20. One preferred heat source 52 comprises a forced air resistance heating unit. Other examples of suitable heat sources 52 include radiant heating units, heat lamps, etc. All of these heat sources can be termed "remote" heat sources because they do not typically contact the platter 20 directly, but rather direct a flow of heated fluid towards the platter 20 from a remote location that is removed from direct contact with the platter.

The depicted system 10 also includes a media heat source 54 that is generally directed at the media 16 on the platter 20. The media heat source 54 can be a forced air resistance heating unit similar to the platter heat source 52 or, alternatively, the media heat source 54 can take the form of radiant heating units, heat lamps, etc. Like the platter heat source 52, the media heat sources 54 used in this embodiment are also remote heat sources in that they do not contact the data storage media directly.

Both the platter heat source 52 and the media heat source 54 are preferably used to direct thermal energy, typically through the medium of heated air, into an enclosure 60 as schematically depicted in FIG. 1. Although only a single platter heat source 52 and a single media heat source 54 are depicted, it should be understood that a plurality of either of the heat sources 52 or 54 could be provided or a single heat source could be used to direct a fluid through a plurality of orifices within the enclosure 60. The use of more than one heat source or a plurality of orifices can be useful in balancing the thermal characteristics of the system to optimize heat transfer.

Figure 2:
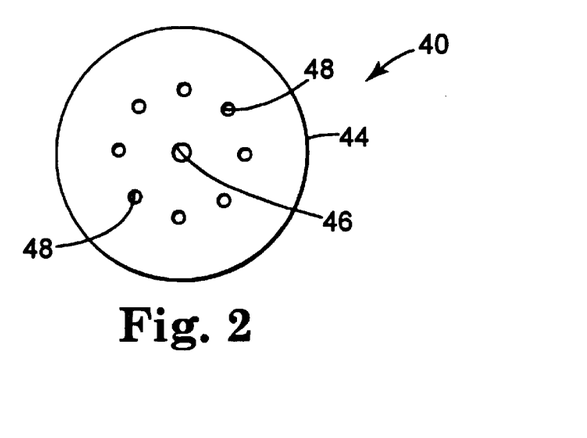
FIG. 2 is an enlarged view of the carbon dioxide cleaning nozzle depicted as a part of the system of FIG. 1, the view being taken along line 2—2 in FIG. 1.

The end of one preferred carbon dioxide cleaning nozzle 40 is depicted in an enlarged view in FIG. 2. The nozzle 40 includes a body 44 in which at least one carbon dioxide orifice 46 is located. Although only one carbon dioxide orifice is depicted, it will be understood that any number of carbon dioxide orifices could be provided in the nozzle 40 and that the carbon dioxide orifice 46 (or plurality of orifices) could take any shape or configuration, e.g., a slot or linear array of openings.

In the depicted embodiment, a series of heating orifices 48 are provided around the carbon dioxide orifice and aligned generally coaxial with the carbon dioxide orifice 46. As a result, when carbon dioxide crystals are flowing from the carbon dioxide orifice 46 towards the media 16 during cleaning, a coaxial stream or streams of relatively warmer and/or drier air or another fluid (preferably a gas) can also being directed towards the media 16. If warmer air or another gas is used, it may at least partially counteract the cooling effect of the carbon dioxide used in cleaning. If drier air or a gas is used, the localized area in which the carbon dioxide crystals are impinging on the surface of the disk may have a dew point that is sufficiently low to reduce or prevent the formation of ice crystals on the media surface.

The fluids exiting the heating orifices 48 are preferably warmer than the carbon dioxide crystals exiting from the carbon dioxide orifice 46. Although referred to herein as "heated," it will be understood that even fluids, such as air, at the ambient temperature in which the system 10 is operated could have some beneficial effects on the thermal control of the media 16 being cleaned and that heated should be judged relative to the thermal content of the carbon dioxide cleaning medium.

Also, although a plurality of heating orifices 48 are depicted in the preferred nozzle 40, it will be understood that one or more orifices 48 could be provided. In addition, the orifices 48 could take any desired shape or configuration, e.g., a ring orifice could be provided in which the carbon dioxide orifice 46 is located.

Figure 3:
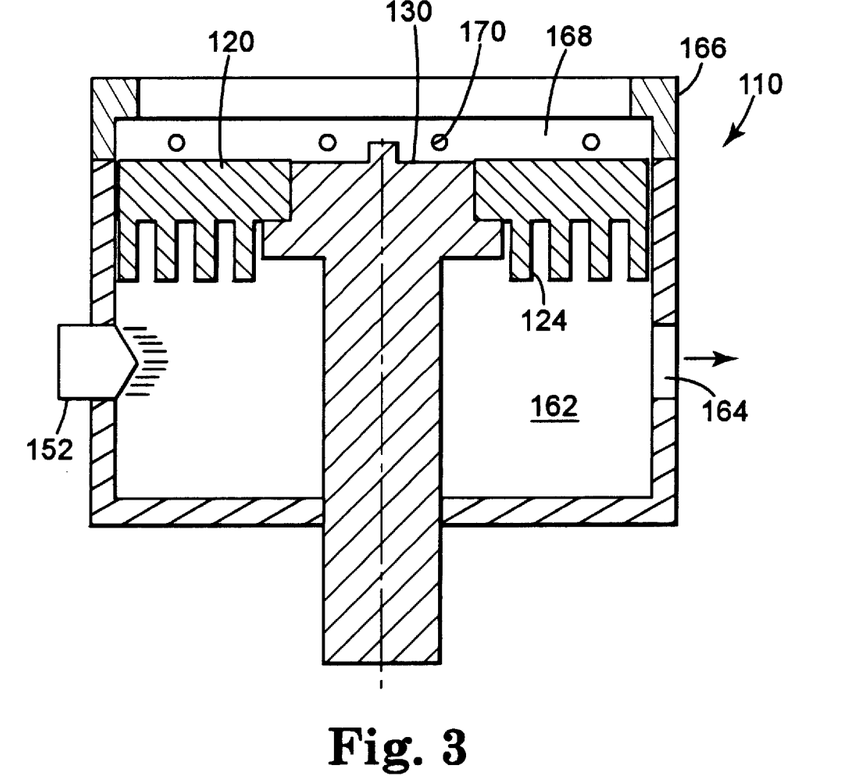
FIG. 3 is a schematic diagram of an alternate system according to the present invention.

Referring back to FIG. 1, although the enclosure 60 is shown as defining a single substantially enclosed volume, it should be understood that two or more separate enclosures could be provided in system 10. One such variation is depicted in FIG. 3, in which system 110 is depicted including a media platter 120 and spindle 130. The system 110 includes an enclosure defining a lower volume 162 in which the fins 124 of the platter 120 are located. A platter heat source 152 is depicted providing thermal energy within the lower volume 162. One preferred platter heat source 152 is a forced air resistance heater and, as a result, the lower volume 162 includes a vent 164 to allow the heated air supplied by the platter heat source 152 to flow through the lower volume 162.

Also depicted in FIG. 3 is a shroud 166 that preferably surrounds the periphery of the media platter 120. The shroud 166 defines an upper volume 168 in which the data storage disks (not shown) are placed for cleaning. The shroud 166 preferably includes a plurality of openings 170 directed into the upper volume 168 and through which heated air (or another fluid) can be directed from a media heat source (not shown).

One important characteristic in the design of the system 10, is that intimate contact between the media 16 and the upper surface 22 of the platter 20 is preferred to facilitate conductive heat transfer from the platter 20 to the media 16 to at least partially counter the cooling effects of the carbon dioxide cleaning process. By "intimate contact" it is meant that thermal energy contained in the platter 20 can be conductively transferred to the media 16 at a rate sufficient to prevent or at least reduce condensation on the surface of the media 16. In one preferred embodiment, intimate contact is provided when the air gap between the media 16 and the upper surface 22 of the platter 20 is about 0.001 inches (about 25 micrometers) or less, more preferably about 0.0002 inches (about 5 micrometers) or less.

As a part of the intimate contact, the upper surface 22 of the platter 20 is preferably relatively smooth to reduce variations in the air gap and corresponding rates of thermal energy transfer from the platter 20 to the media 16. In one preferred embodiment, the upper surface 22 of the platter 20 has surface roughness of about 16 micro-inches (about 0.4 micrometers) $R_a$, more preferably about 4 micro-inches to about 8 micro-inches (about 0.1 micrometers to about 0.2 micrometers) $R_a$.

Also playing a role in the rate of heat transfer between the platter 20 and the media 16 is the material used for the platter 20. It is preferred that materials used to construct at least the upper surface 22 of the platter 20 exhibit thermal conductivity of about 90 Btu/(hr(ft$^2$)(° F./ft)) or greater (about 150 W/(m$^2$(K/m)) or greater), more preferably about 180 Btu/(hr(ft$^2$)(° F./ft)) or greater (about 300 W/(m$^2$(K/m)) or greater).

By using materials with high rates of thermal conductivity, the rate of heat transfer across the platter/media interface can be maintained at sufficient levels to prevent or reduce condensation on the media 16. It is also preferred that the remainder of the platter 20, not just the upper surface 22, be constructed of materials with high thermal conductivity to facilitate heat transfer from the environment in which the fins 24 are located, as well as through the bulk of the platter 20 itself. One preferred material exhibiting relatively high thermal conductivity is copper. Another suitable material for the media platters is aluminum, although other materials may also be considered.

Another physical characteristic of the materials used for the media platters 20 that may be advantageous is a relatively large thermal heat capacity which is a function of the mass of the platter 20 and the specific heat of the materials used to manufacture the platter 20. It may be desirable to manufacture the platters 20 from a material with a specific heat of about 0.05 Btu/lb(° F.) (about 200 J/kg(K)) or greater, more preferably about 0.1 Btu/lb(° F.) (about 400 J/kg(K)) or greater, and even more preferably about 0.2 Btu/lb(° F.) (about 800 J/kg(K)) or greater.

By manufacturing the platters 20 of materials with higher specific heats, the mass of the platter 20 required to provide a desired thermal heat capacity may be reduced as compared to platters having the same mass, but which are manufactured of materials having lower specific heats. Platters with lower mass may provide advantages in acceleration and deceleration during the cleaning process.

For ease of manufacturing, the platter 20, including upper surface 22 and fins 24 can be manufactured from, e.g., a single piece of material such as copper. It should, however, be understood that the platter 20 could be provided as a composite article in which a number of different materials are used to provide the desired thermal properties required to reduce or prevent condensation from forming on the media 16.

Although it could also be helpful to provide the spindle 30 of a material having high thermal conductivity, other factors typically outweigh thermal conductivity when choosing the materials of the spindle 30. For example, the spindle 30 is subjected to more severe wear than the platter 20 because the hubs 14 of the data storage disks 12 are typically metals, such as stainless steel. As a result, if the spindle 30 were manufactured of a material that is softer than the hub material 14, excessive wear could occur, necessitating frequent replacement of the spindle 30. Furthermore, the amount of thermal energy that can be transferred from the hub 14 to the media 16 is limited—particularly when compared to the thermal energy that can be transferred from the platter 20 to the media 16.

When the system 10 is used to clean data storage disks 12 that include a central hub 14 having media 16 bonded thereto, such as 3.5 inch (90 millimeter) 1.44 megabyte magnetic data storage disks or LS-120 format magnetic data storage disks such as the SUPERDISK™ manufactured by Imation Corp., St. Paul, Minn., the design of the platter 20/spindle 30 and the disk 12 preferably compensates for the shape of the interface between the hub 14 and media 16 by forming a hub recess for receiving the hub 14.

Figure 4:
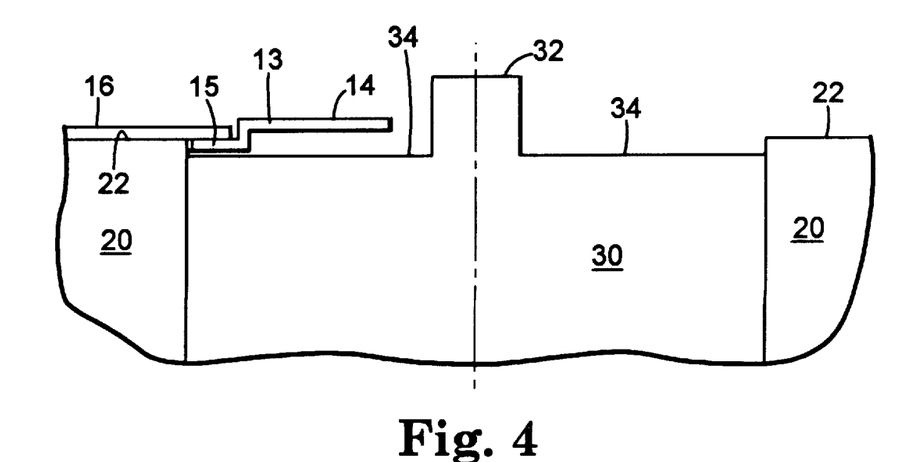
FIG. 4 is an enlarged partial cross-sectional view of the spindle area of the system depicted in FIG. 1.

One approach to providing a hub recess is illustrated in FIG. 4 where the upper surface 34 of the spindle 30 is lower than the media platform 22 portion of the platter 20. The difference in relative heights between the media platform 22 and the upper surface 34 of the spindle 30 is preferably large enough to compensate for the thickness of the flange 15 of the hub 14 and any materials (e.g., adhesives, etc.) used to bond the media 16 to the hub 14. Preferably, the flange 15 of the hub 14 is suspended above the upper surface 34 of the spindle 30 while the media 16 rests on the media platform 22 of the platter 20. In other words, the bottom of the flange 15 is spaced from the upper surface 34 of the spindle 30.

By providing a hub recess sufficiently deep to suspend the outer flange 15 of the hub 14 above the upper surface 34 of the spindle 30, the data storage media 16 immediately surrounding the outer flange 15 of the hub 14 can be in direct contact with the upper surface 22 of the heated media platter 20. As a result, substantially all of the lower surface of the data storage media 16 is in contact with the upper surface 22 of the media platter 20.

Figure 5:
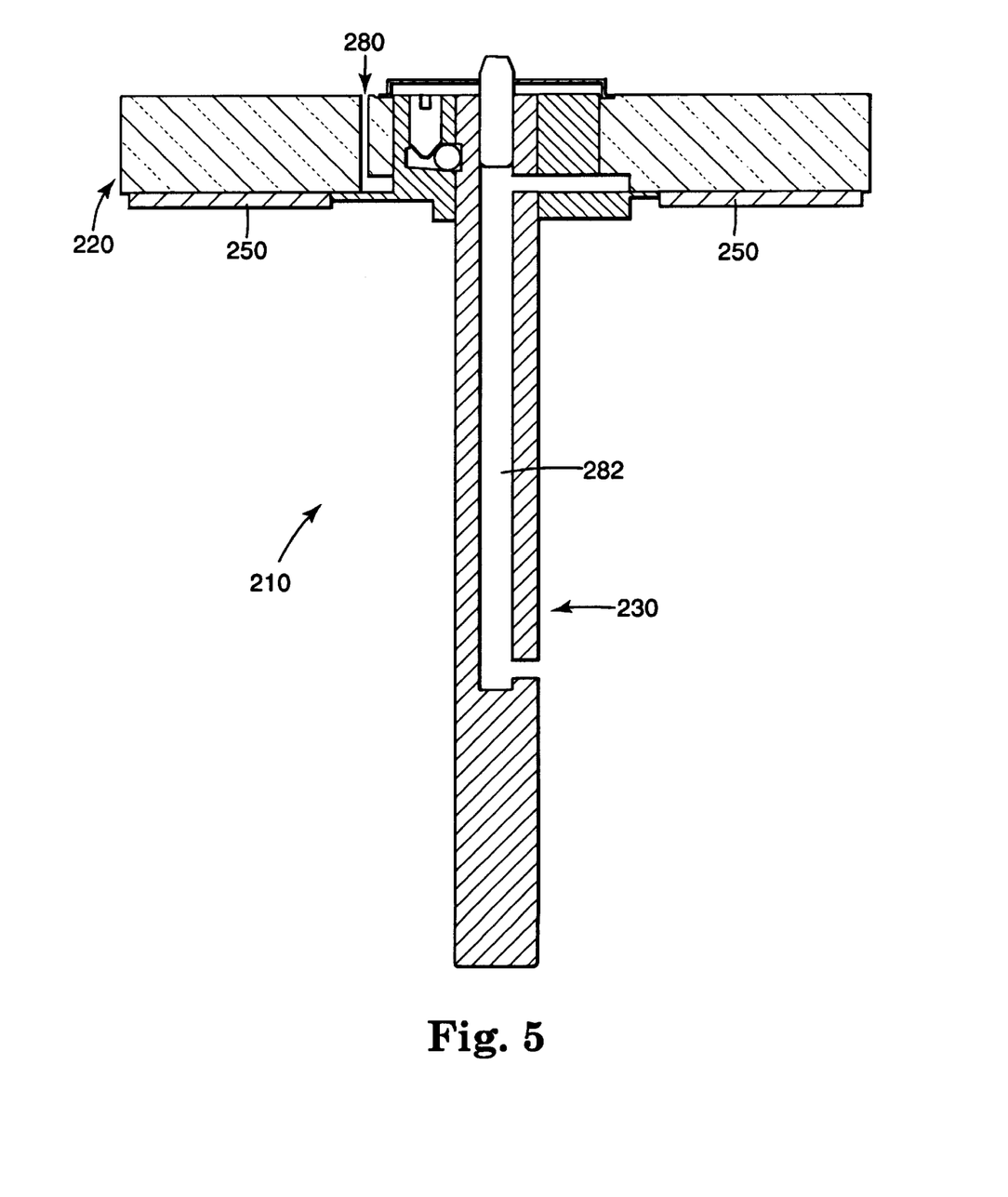
FIG. 5 is a cross-sectional view of another spindle and media platter according to the present invention.
Figure 6:
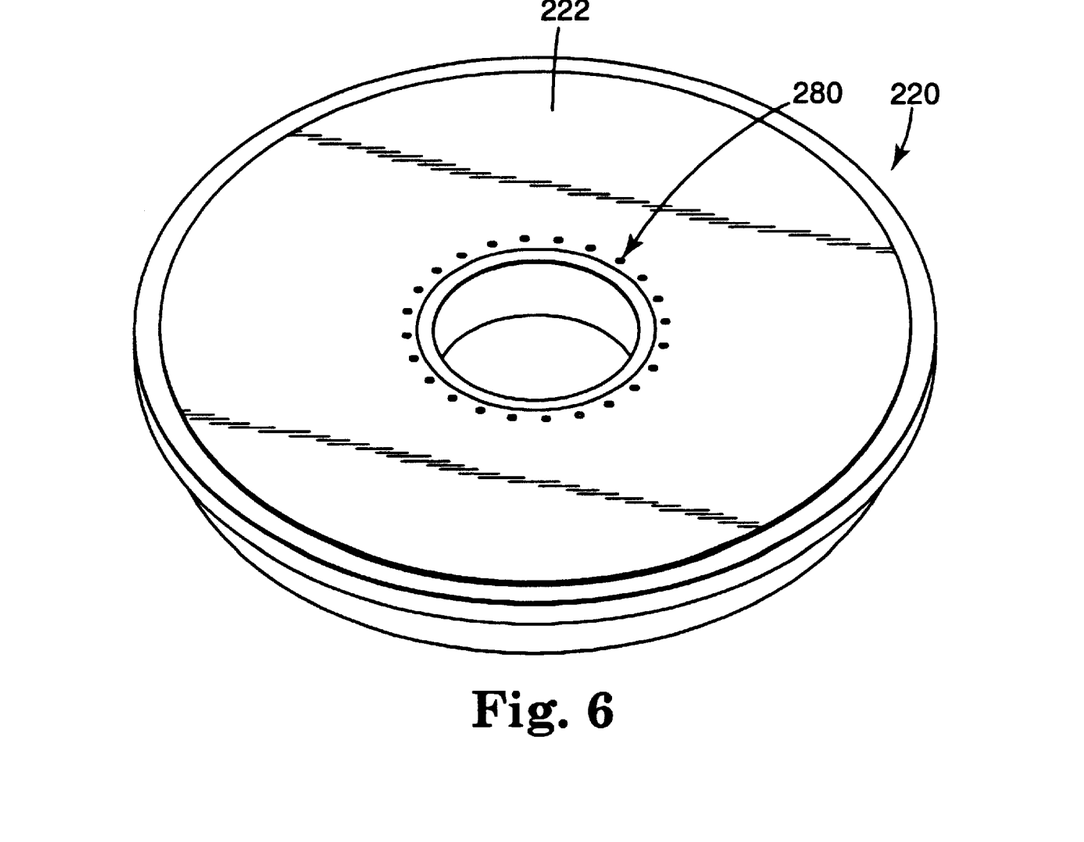
FIG. 6 is a top perspective view of the media platter of FIG. 5.
Figure 7:
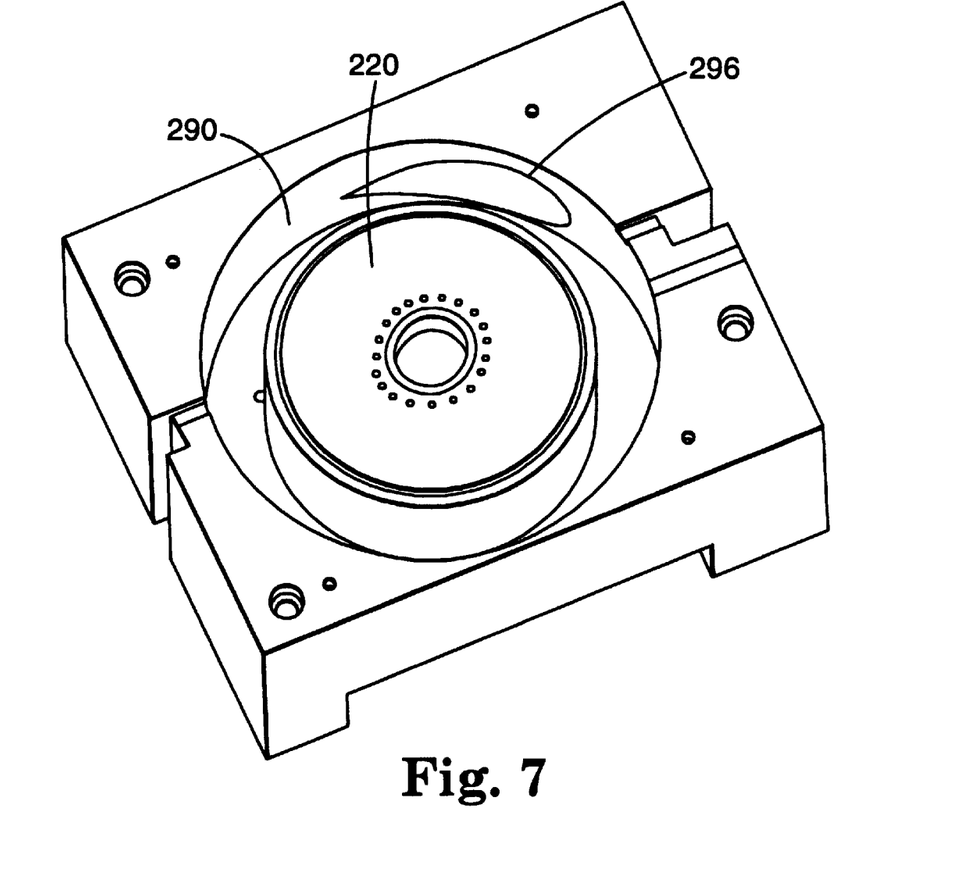
FIG. 7 is a top perspective view of the media platter of FIG. 6 located within a vacuum channel.

FIGS. 5–7 illustrate various aspects of an alternative system according to the present invention. FIG. 5 is a cross-sectional view of the system illustrating the spindle 230 and surrounding media platter 220.

One difference between the system 210 in FIG. 5 and the systems described above is that the media platform 220 is heated by a thermal blanket 250. The thermal blanket 250 is in direct contact with the media platform 220 and transfers thermal energy conductively to the media platter 220. One preferred thermal blanket is an electrical resistive heater although other heating elements could be substituted.

In the illustrated embodiment, the thermal blanket 250 is located on the underside of the media platter 220. The thermal blanket 250 could, alternatively, be positioned at a variety of locations, e.g., within the media platter 220, etc. It may, however, be preferred that the thermal blanket not be located in direct contact with the data storage media placed on the media platter 220 to avoid exposing the media to potential hot spots on the thermal heater 250.

Figure 5A:
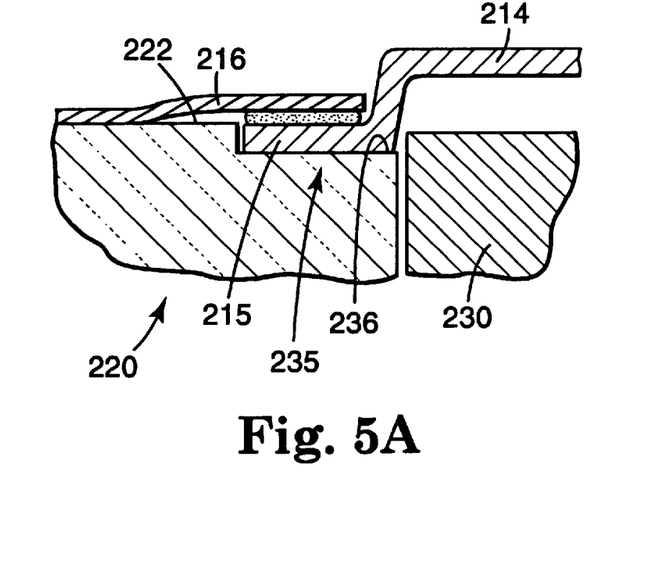
FIG. 5A is an enlarged partial cross-sectional view of the spindle and media platter of FIG. 5.

FIG. 5A is an enlarged partial cross-sectional view of the interface between the hub 214, media 216, spindle 230 and media platter 220. Unlike the design of the media platter 20 and spindle 30 described above in which the upper surface 34 of the spindle 30 and the media platform 22 form the hub recess, the media platter 220 itself is used to form a hub recess 235. The relative height of the media platform 222 of the platter 220 is preferably raised as compared to the height of the bottom 236 of the hub recess 235.

The difference in relative heights between the upper surface 222 and the bottom 236 of the hub recess 235 is preferably large enough to compensate at least partially for the thickness of the hub flange 215 and any materials (e.g., adhesives, etc.) used to bond the media 216 to the hub flange 215. The hub flange 215 is, however, preferably supported by the bottom 236 of the hub recess 235. In other words, the bottom of the flange 215 is in physical contact with the bottom 236 of the hub recess 235. It is further preferred that, in the absence of any external forces, the media 216 directly surrounding the hub flange 215 is slightly raised from contact with the media platform 222 portion of the platter 220.

FIG. 6 illustrates the upper surface of the media platter 220 and the vacuum openings 280 provided in the media platform 222. When the system 210 is in use, the vacuum pulled through the vacuum openings 280 preferably urges or pulls the media 216 surrounding the hub flange 215 down into contact with the media platform 222. In addition, the vacuum also preferably draws the media 216 located farther away from the hub recess 235 into intimate contact with the media platform 222. Although it is preferred that the vacuum openings 280 be located about the hub recess 235, it will be understood that they could be located at other places in the media platform 222 in addition to the illustrated placement or in place of the illustrated placement of the vacuum openings 280.

The vacuum openings 280 are preferably in fluid communication with a vacuum source (not shown) through a passageway 282 (see FIG. 5) formed in the spindle 230. As a vacuum is drawn through the passageway 282 and openings 280, air located between the upper surface 222 of the media platter 220 and the data storage media (not shown) is removed. As discussed above, that vacuum may serve to further draw the media into more intimate contact with the media platter 220 to further enhance heat transfer to the media 216.

By forming the hub recess 235 in the media platter 220, more precise control over the relative height of the bottom 236 of the hub recess 235 and the media platform 222 can be obtained. That additional control can ensure that the media located directly about the hub recess 235 is raised sufficiently from the media platform 222 to allow a vacuum to be drawn through the vacuum openings 280. The vacuum through the vacuum openings 280 may then operate more effectively to draw the media down into contact with the media platform 222.

Figure 8:
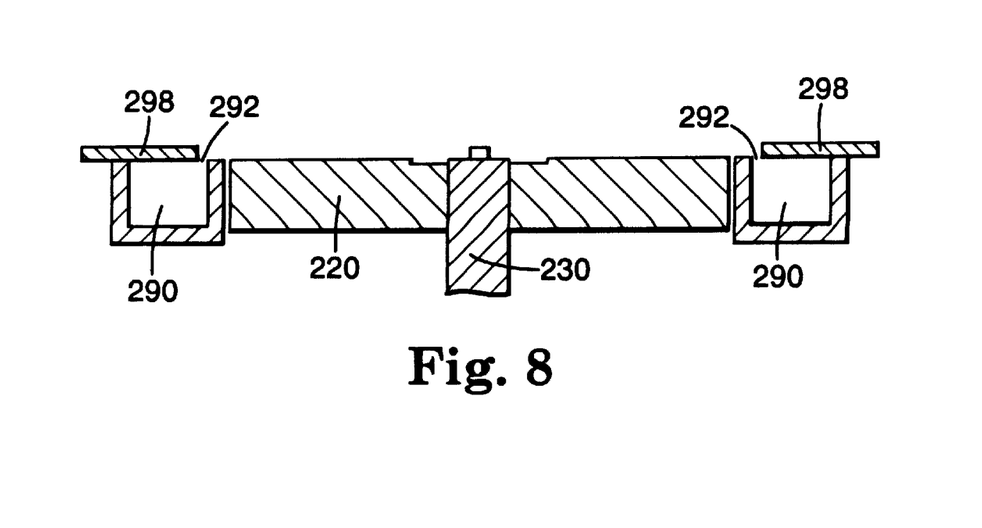
FIG. 8 is a cross-sectional view of the media platter and vacuum channel of FIG. 7 including a vacuum channel cover.

In addition to the hub recess, smooth upper surface, and vacuum openings, another feature of the systems and methods of the present invention that may be used to improve heat transfer between the media and the media platter is the use of a vacuum channel in which the media platter rotates during operation. The vacuum channel 290 is depicted in FIGS. 7 and 8 and is located about the periphery of the media platter 220. The view in FIG. 7 is taken with the vacuum channel cover 298 removed to expose the interior of the channel 290.

A vacuum port 296 opens into the channel 290 (see FIG. 7) through which a vacuum can be drawn during operation of the system. That vacuum can assist in carrying away debris removed from the media surface during the cleaning process. The illustrated vacuum port 296 is a circular bore formed tangential to the channel 290.

Referring to FIG. 8, it is also preferred that a significant portion of the vacuum channel 290 be partially enclosed by a vacuum channel cover 298. The channel cover 298 preferably does not completely enclose the channel 290, but leaves an annular opening 292 about the media platter 220 through which air can pass into the channel 290 and out of the vacuum port 296 during operation of the system. It is preferred that the cross-sectional area of the annular opening 292 be substantially equal to the cross-sectional area of the vacuum port 296. That equivalence may reduce or eliminate turbulence.

By directing the vacuum port 296 along a tangent to the channel 290 and providing an annular ring opening 292 between the channel cover 298 and the media platter 220, a vortex or cyclonic effect can be produced when a vacuum is drawn tangentially through the vacuum port 296. That cyclonic airflow effect can provide even vacuum distribution about the periphery of the media platter 220. The even vacuum distribution can reduce fluttering of the media on the media platter 220 and may also draw the periphery of the media down into intimate contact with the media platter 220.

It should be understood that the vacuum port 296 may be oriented along a direction that is not tangential to the channel 290, but that such an orientation may not supply all of the benefits provided by orienting the port 296 along a tangent. Furthermore, although only one port 296 is illustrated, more than one vacuum port in fluid communication with the channel 290 may be provided. As discussed above with respect to illustrated vacuum port 296, any additional ports would also preferably be oriented substantially tangential to the media platter 220.

The characteristics of the vacuum drawn through the vacuum openings 280 in the media platter 220 and the vacuum port 296 in the channel 290 (e.g., flow rates, mm of mercury, etc.) are variable based on a variety of factors including, but not limited to: the size of the media, the size of the media platter, flow rates from the cleaning equipment, flow rates from any heating sources employing heated fluids, etc.

Various modifications and alterations of this invention will become apparent to those skilled in the art without departing from the scope of this invention, and it should be understood that this invention is not to be unduly limited to the illustrative embodiments and method set forth herein.

What is claimed is:

1. A system for reducing condensation on a data storage media of a data storage disk during cleaning with carbon dioxide crystals, the data storage disk including data storage media attached to an outer flange of a central hub, the outer flange having a flange thickness, the system comprising:
    a hub recess adapted to receive at least a portion of the outer flange of the central hub of the data storage disk;
    a media platform surrounding the hub recess, the media platform supporting the data storage media;
    at least one vacuum opening in the media platform;
    a cleaning nozzle directing carbon dioxide crystals at the data storage media of the data storage disk; and
    a heat source thermally connected to the media platform; wherein thermal energy is transferred to the hub and the data storage media during cleaning.

2. A system according to claim 1, wherein the outer flange of the central hub of the data storage disk is in contact with a bottom of the hub recess.

3. A system according to claim 1, wherein the hub recess is formed in the media platform.

4. A system according to claim 1, further comprising a plurality of vacuum openings in the media platform.

5. A system according to claim 4, wherein the plurality of vacuum openings are spaced about the hub recess.

6. A system according to claim 1, further comprising a vacuum channel surrounding the media platform, wherein the vacuum channel comprises a vacuum port oriented along a tangent to the media platform.

7. A system according to claim 6, further comprising a vacuum channel cover, wherein the vacuum channel cover and the media platform define an annular opening into the vacuum channel, the annular opening located about the media platform.

8. A system for reducing condensation on a data storage media of a data storage disk during cleaning with carbon dioxide crystals, the data storage disk including data storage media attached to an outer flange of a central hub, the outer flange having a flange thickness, the system comprising:
    a hub recess adapted to receive at least a portion of the outer flange of the central hub of the data storage disk;
    a media platform surrounding the hub recess, the media platform supporting the data storage media;
    a vacuum channel surrounding the media platform, wherein the vacuum channel comprises a vacuum port oriented along a tangent to the media platform;
    a cleaning nozzle directing carbon dioxide crystals at the data storage media of the data storage disk; and
    a heat source thermally connected to the media platform; wherein thermal energy is transferred to the hub and the data storage media during cleaning.

9. A system according to claim 8, further comprising a vacuum channel cover, wherein the vacuum channel cover and the media platform define an annular opening into the vacuum channel, the annular opening located about the media platform.

10. A system according to claim 8, further comprising a plurality of vacuum openings in the media platform, wherein the plurality of vacuum openings are spaced about the hub recess.

11. A system according to claim 8, wherein the outer flange of the central hub of the data storage disk is in contact with a bottom of the hub recess.

12. A system according to claim 8, wherein the hub recess is formed in the media platform.

13. A system according to claim 8, wherein the heat source comprises an electrical resistance heater in contact with the media platform.

14. A method for reducing water vapor condensation on a data storage media of a data storage disk during cleaning with carbon dioxide crystals, the method comprising:
    locating at least a portion of an outer flange of a hub of a data storage disk in a hub recess, wherein the data storage media is supported by a media platform surrounding the hub recess;
    drawing a vacuum through at least one vacuum opening in the media platform;
    directing a stream of carbon dioxide crystals at the data storage media from a cleaning nozzle; and
    heating the media platform.

15. A method according to claim 14, further comprising conductively heating the data storage media using the media platform.

16. A method according to claim 14, wherein the outer flange of the hub is supported by the hub recess such that the data storage media directly surrounding the hub recess is supported above the surface of the media platform when a vacuum is not drawn through the vacuum opening.

17. A method according to claim 16, further comprising drawing a vacuum through a plurality of vacuum openings in the media platform, wherein the vacuum openings are spaced about the hub recess.

18. A method according to claim 14, further comprising drawing a vacuum through a vacuum channel located about the media platform, the vacuum being drawn through a vacuum port oriented along a tangent to the media platter.

19. A method according to claim 18, further comprising enclosing a portion of the vacuum channel with a vacuum channel cover, wherein the vacuum channel cover and the media platform define an annular opening located about the media platform, the annular opening in fluid communication with the vacuum channel.

20. A method for reducing water vapor condensation on a data storage media of a data storage disk during cleaning with carbon dioxide crystals, the method comprising:
    locating at least a portion of an outer flange of a hub of a data storage disk in a hub recess, wherein the data storage media is supported by a media platform surrounding the hub recess;

drawing a vacuum through a vacuum channel located about the media platform, the vacuum being drawn through a vacuum port oriented along a tangent to the media platter;

directing a stream of carbon dioxide crystals at the data storage media from a cleaning nozzle; and heating the media platform.

21. A method according to claim 20, further comprising enclosing a portion of the vacuum channel with a vacuum channel cover, wherein the vacuum channel cover and the media platform define an annular opening located about the media platform, the annular opening in fluid communication with the vacuum channel.

22. A method according to claim 21, further comprising drawing a vacuum through a plurality of vacuum openings in the media platform, wherein the vacuum openings are spaced about the hub recess.

* * * * *